(12) United States Patent
Yang

(10) Patent No.: US 10,739,629 B2
(45) Date of Patent: Aug. 11, 2020

(54) DISPLAY PANEL AND DISPLAY DEVICE

(71) Applicant: HKC CORPORATION LIMITED, Shenzhen, Guangdong (CN)

(72) Inventor: Chunhui Yang, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 45 days.

(21) Appl. No.: 16/314,050

(22) PCT Filed: Nov. 28, 2018

(86) PCT No.: PCT/CN2018/117939
§ 371 (c)(1),
(2) Date: Dec. 28, 2018

(87) PCT Pub. No.: WO2020/087613
PCT Pub. Date: May 7, 2020

(65) Prior Publication Data
US 2020/0133038 A1  Apr. 30, 2020

(30) Foreign Application Priority Data

Oct. 30, 2018 (CN) .......................... 2018 2 1775049

(51) Int. Cl.
*G02F 1/1333* (2006.01)
*G02F 1/1339* (2006.01)

(52) U.S. Cl.
CPC .... *G02F 1/133345* (2013.01); *G02F 1/13394* (2013.01); *G02F 2001/13396* (2013.01)

(58) Field of Classification Search
CPC ........... G02F 1/133345; G02F 1/13394; G02F 2001/13396
See application file for complete search history.

(56) References Cited

U.S. PATENT DOCUMENTS

| 2016/0062170 A1* | 3/2016 | Yin | G02F 1/133516 349/106 |
| 2016/0170273 A1* | 6/2016 | Lee | G02F 1/134309 349/43 |

* cited by examiner

*Primary Examiner* — Phu Vu

(57) ABSTRACT

A display panel and a display device, including a first substrate and a second substrate arranged opposite each other and spaced apart from each other, and a main spacer and a sub-spacer arranged between the first substrate and the second substrate, with bottom ends of both the main spacer and the sub-spacer arranged at the first substrate. In this display panel, by providing a part of a surface of the second substrate with a transparent conductive layer, the main spacer is able to directly press against the transparent conductive layer. By defining a groove in the second substrate with an opening thereof opposite the sub-spacer, a free end of the sub-spacer can be inserted into the groove when being applied with a supporting force. Thus, a step difference between the two spacers can increase by a thickness of the transparent conductive layer and a depth of the groove.

20 Claims, 5 Drawing Sheets

DISPLAY PANEL AND DISPLAY DEVICE

CROSS-REFERENCE TO RELATED APPLICATIONS

This application is the International Application No. PCT/CN2018/117939 for entry into US national phase with an international filing date of Nov. 28, 2018, designating US, and claims priority to Chinese Patent Application No. 201821775049.4, filed on Oct. 30, 2018, the content of which is incorporated herein by reference in its entirety.

BACKGROUND

Technical Field

The present application relates to the technical filed of displaying, and more particularly to a display panel and a display device.

Description of Related Art

It is well known that a liquid crystal display panel typically includes a thin film transistor (TFT) array substrate, a color filter (CF) substrate, and a liquid crystal layer sandwiched between the TFT array substrate and the CF substrate. A liquid crystal cell accommodating the liquid crystal layer is formed by a cell process using the CF substrate and the TFT array substrate and is a key of the liquid crystal display panel. In addition, the CF substrate is a key material to achieve the color displaying of a thin film transistor liquid crystal display (TFT-LCD), and accounts for the highest production cost in a display screen. In addition to the color, the CFC substrate also affects the brightness and contrast and other optical features.

Generally, in order to maintain a gap between the CF substrate and the TFT array substrate, that is, the stability of the liquid crystal cell, the CF substrate includes post spacers (PSs), and the post spacers are in direct contact with the liquid crystal layer within the liquid crystal cell. The liquid crystal cell typically includes two kinds of post spacers, one kind is a main PS configured to maintain a thickness of the liquid crystal cell in normal circumstance, and the other kind is a sub-PS configured to support under the press of an external force. It may be understood that after the cell process using the CF substrate and the TFT array substrate, the main PS presses against the TFT array substrate, and the sub-PS is spaced apart from the TFT array substrate.

In case of too high the temperature within the liquid crystal cell, the liquid crystal volume bulges, the support force of the main PS decreases, and the increased liquid crystal will locally accumulated and result in gravity Mura (which particularly means the phenomenon of the occurrence of color ununiformity of a lower edge when the liquid crystal display screen is turned on at high temperature), in which, the boundary liquid crystal amount in case of gravity Mura of the liquid crystal occurring in the liquid crystal cell is defined as L1; in contrast, when the temperature inside the liquid crystal cell is too low, the liquid crystal volume is reduced, and the auxiliary PS also starts to contact and generate supporting force, thereby preventing the thickness of the liquid crystal cell from further decreasing. In such case, vacuum bubbles may occur in a local space due to the absence of liquid crystal, and the boundary liquid crystal amount in case of vacuum bubbles occurring in the liquid crystal cell is defined as L2. Generally, the liquid crystal amount ranging between L1 and L2 is referred to as liquid crystal margin (LC margin). It can be understood that neither gravity Mura nor vacuum bubble phenomenon will occur in the liquid crystal in the liquid crystal cell within this range. In order to ensure the stability of the liquid crystal cell, the above two kinds of PS usually produce a PS step difference, and it is required to ensuring that the LC margin is large enough. However, a proper PS step difference ($\Delta PS$) between the two kinds of PSs is a necessity to ensure a sufficient large LC margin.

SUMMARY

It is one object of the present application to provide a display panel, for the purpose of, comprising but not limited to, improving the phenomenon of non-stability of the performance of the display panel due to the insufficient step difference between the main spacer and the sub-spacer.

Technical solutions adopted in the present application are as follows: a display panel is provided. The display panel comprises:

a first substrate;

a second substrate, arranged opposite to and spaced apart from the first substrate;

main spacers, arranged between the first substrate and the second substrate, with each main spacer having a bottom end arranged at the first substrate and a top end abutting against the second substrate; and sub-spacers, arranged between the first substrate and the second substrate, with each sub-spacer having a bottom end arranged at the first substrate and a top end being a free end.

A part of a surface of one side of the second substrate adjacent to the first substrate is provided with a transparent conductive layer, and the second substrate defines therein a groove.

The transparent conductive layer is in abutting connection with the top end of the respective main spacer.

An opening of the groove is arranged opposite the respective sub-spacer, and configured to allow the free end of the respective sub-spacer to be inserted therein.

It is another object of the present application to provide a display panel. The display panel comprises:

a color filter substrate;

an array substrate, arranged opposite to and spaced apart from the color filter substrate;

main spacers, arranged between the color filter substrate and the array substrate, with each main spacer having a bottom end arranged at the color filter substrate and a top end abutting against the array substrate; and sub-spacers, arranged between the color filter substrate and the array substrate, with each sub-spacer having a bottom end arranged at the color filter substrate and a top end being a free end.

The array substrate comprises:

an array substrate layer, arranged opposite to and spaced apart from the color filter substrate; and a dielectric layer, arranged at one side of the array substrate layer adjacent to the color filter substrate.

A part of a surface of one side of the dielectric layer adjacent to the color filter substrate is provided with a transparent conductive layer, and the dielectric layer defines therein a groove.

The transparent conductive layer is in abutting connection with a top end of the respective main spacer to increase a step difference between the respective main spacer and the respective sub-spacer.

An opening of the groove is arranged opposite the respective sub-spacer, and configured to allow the free end of the respective sub-spacer to be inserted therein; and a depth of the groove is smaller or equal to a height of the dielectric layer.

It is still another object of the present application to provide a display device. The display device comprises a display panel, and the display panel comprises:

a first substrate;

a second substrate, arranged opposite to and spaced apart from the first substrate;

main spacers, arranged between the first substrate and the second substrate, with each main spacer having a bottom end arranged at the first substrate and a top end abutting against the second substrate; and sub-spacers, arranged between the first substrate and the second substrate, with each sub-spacer having a bottom end arranged at the first substrate and a top end being a free end;

a part of a surface of one side of the second substrate adjacent to the first substrate is provided with a transparent conductive layer, and the second substrate defines therein a groove.

The transparent conductive layer is in abutting connection with the top end of the respective main spacer.

An opening of the groove is arranged opposite the respective sub-spacer, and configured to allow the free end of the respective sub-spacer to be inserted therein.

In the display panel and the display device provided by embodiments of the present application, by providing a part of a surface of one side of the second substrate adjacent to the first substrate with the transparent conductive layer, the main spacers directly press against the transparent conductive layer, such that a step difference between the respective main spacer and the respective sub-spacer increases by a thickness of the transparent conductive layer. By arranging the groove in the second substrate with the opening of the groove being opposite the respective sub-spacer, the free end of the respective sub-spacer can be inserted into the groove when applied with a supporting force, in this way, the step difference between the respective main spacer and the respective sub-spacer increases by a depth of the groove, so that the step difference between the respective main spacer and the respective sub-spacer greatly increases. In this way, the influence of the temperature change on the thickness of the liquid crystal cell is reduced, the stability of the liquid crystal cell is ensured, the display performance stability of the display panel and the display device is ensured, and the display quality of the display device is improved.

BRIEF DESCRIPTION OF THE DRAWINGS

In order to more clearly illustrate the technical solution in embodiments of the present application, the following drawings, which are to be used in the description of the embodiments or the existing techniques, will be briefly described. It will be apparent that the drawings described in the following description are merely embodiments of the present application. Other drawings may be obtained by those skilled in the art without paying creative labor.

Figure 1:
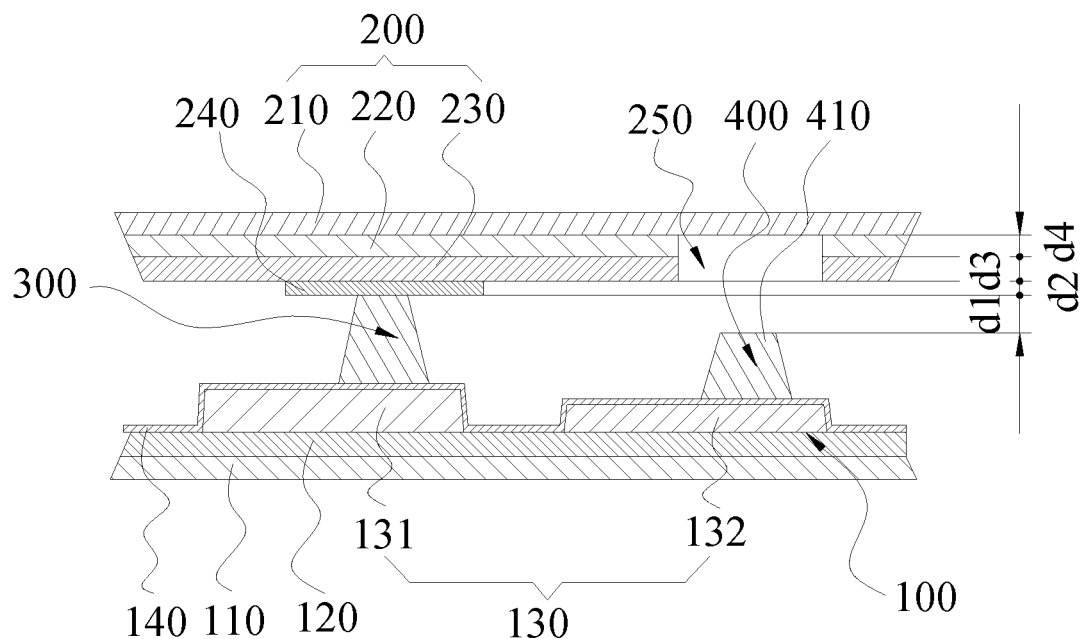
FIG. 1 is a structural schematic view of a cross section of a display panel in a first embodiment of the present application, in which a part of a surface of a passivation layer is provided with a transparent conductive layer, and a groove is defined in the passivation layer and an insulating protective layer, and a shape of a longitudinal section of the groove is rectangular.
Figure 2:
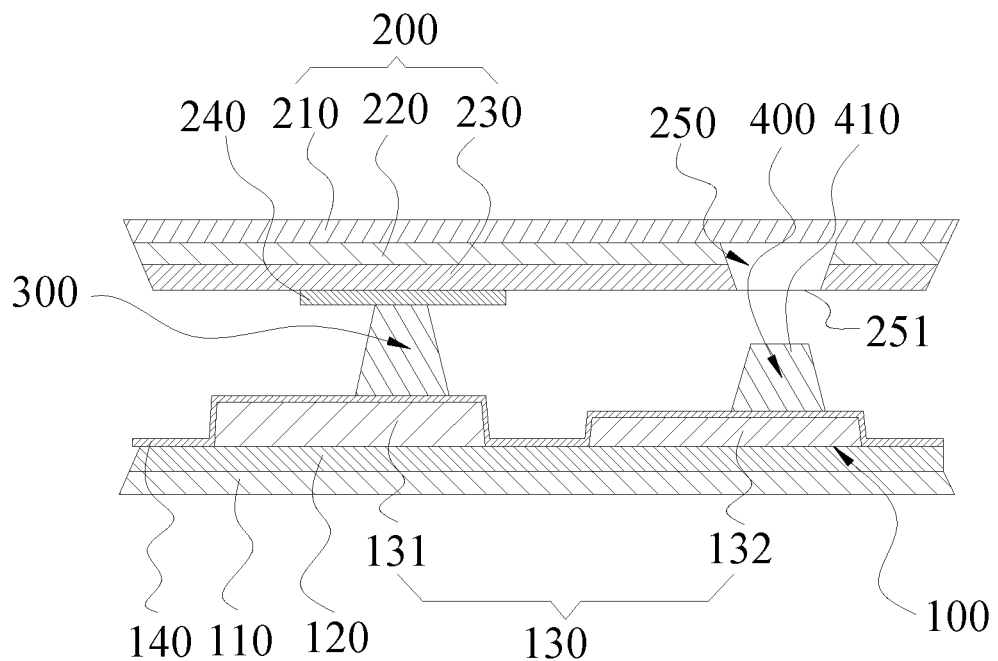
FIG. 2 is a structural schematic view of a cross section of a display panel in a second embodiment of the present application, in which a shape of a longitudinal section of a groove is inverted trapezoid, as compared with the embodiment of FIG. 1.

In the drawings, the following reference numerals are adopted:

10. Display device; 20. Display panel; 30. Backlight module;
100. First substrate/color filter substrate; 110. First substrate layer; 120. Black matrix; 130. Color resist layer; 131. First color resist; 132. Second color resist; 140. Electrode layer;
200. Second substrate/array substrate; 210. Second substrate layer; 220. Insulating protective layer; 230. Passivation layer; 240. Transparent conductive layer; 250. Groove; 251. Opening; 260. Array substrate layer; 270. Dielectric layer;
300. Main spacer; 310. Curved surface; 400. Sub-spacer; and 410. Free end.

DETAILED DESCRIPTION OF THE EMBODIMENTS

In order to make the technical problems to be solved, technical solutions, and beneficial effects of the present application more clear, the present application will be further described in detail hereinbelow with reference to the accompanying drawings and embodiments. It should be understood that the specific embodiments described herein are merely intended to explain the application rather than to limit the present application.

It should be noted that when an element is referred to as being "fixed" or "arranged" at/in/on another element, it can be directly at/in/on the other element. When an element is referred to as being "connected" to/with the another element, it can be directly or indirectly connected to/with the other element. It should be understood that terms "top", "bottom", "left", "right", and the like indicating orientation or positional relationship are based on the orientation or the positional relationship shown in the drawings, and are merely for facilitating the description of the present application, rather than indicating or implying that a device or component must have a particular orientation, or be configured or operated in a particular orientation, and thus should not be construed as limiting the application; and the specific meaning of the above terms can be understood by those skilled in the art according to specific circumstances. Moreover, the terms "first" and "second" are adopted for descriptive purposes only and are not to be construed as indicating or implying a relative importance or implicitly indicating the number of technical features indicated. Thus, features defining "first" and "second" may include one or more of the features either explicitly or implicitly. In the description of the present application, the meaning of "a plurality of" or "multiple" is two or more unless otherwise particularly defined.

In order to explain the technical solutions of the present application, detailed descriptions will be made combining with particular figures and embodiments.

It should be noted that a display panel 20, in one embodiment, can be the liquid crystal display panel, which is mainly applied to products or parts with any display functions, such as liquid crystal televisions, liquid crystal displays, notebook computers, digital photo frames, mobile phones, navigators, tablet computers, etc.

As shown in FIG. 1, a display panel 20 includes a first substrate 100, a second substrate 200, main spacers 300, and sub-spacers 400. The second substrate 200 and the first substrate 100 are arranged opposite each other and spaced apart from each other. As further shown in FIG. 1, the main spacers 300 are arranged between the first substrate 100 and the second substrate 200, of which, a bottom end of the respective main spacer 300 is arranged at the first substrate 100, and a top end thereof presses against the second substrate 200. Correspondingly, the sub-spacers 400 are arranged between the first substrate 100 and the second substrate 200, of which, a bottom end of the respective sub-spacer 400 is arranged at the first substrate 100, and a top end thereof is a free end 410. It can be understood that, in this embodiment, the main spacers 300 and the sub-spacers 400 are located on the same side and are both fixed at the first substrate 100.

In addition, it can be understood that, in a normal state, the first substrate 100 and the second substrate 200 of the display panel 20 are supported by the main spacers 300 separately to ensure the thickness of the liquid crystal cell. The sub-spacers 400 begin to bear the support force only when being applied with an external press. In another word, in the normal state, the main spacers 300 press against the second substrate 200, and a certain distance exists between the respective sub-spacer 400 and the respective second substrate 200. For facilitating the explanation, as shown in FIG. 1, the certain distance is defined as d1. Generally, d1 is an initial step difference between the respective main spacer 300 and the respective sub-spacer 400.

In order to increase the step difference between the respective main spacer 300 and the respective sub-spacer 400, a part of a surface of one side of the second substrate 200 adjacent to the first substrate 100 is provided with a transparent conductive layer 240 (Indium Tin Oxide, ITO layer), and the second substrate 200 defines therein a groove 250. That is, in this embodiment, not only is a part of the surface of the second substrate 200 provided with the transparent conductive layer 240, but also the second substrate 200 defines therein the groove 250.

Particularly, as shown in FIG. 1, when the part of the surface of the second substrate 200 is provided with the transparent conductive layer 240, the transparent conductive layer 240 is arranged opposite the respective main spacer 300, and generally, the transparent conductive layer 240 is in abutting connection with the top end of the respective main spacer 300. In other words, the main spacers 300 press against the second substrate 200 via the abut connection with the transparent conductive layer 240. Thus, a step difference ΔPS between the respective main spacer 300 and the respective sub-spacer 400 in the display panel 20 increases by a thickness d2 of the transparent conductive layer 240.

Correspondingly, as shown in FIG. 1, when the second substrate 200 defines therein the groove 250, an opening 251 of the groove 250 is arranged opposite the respective sub-spacer 400, the free end 410 of the respective sub-spacer 400 may be inserted into the groove 250 in case that the sub-spacer is applied with a supporting force. In this way, a lowering height of the second substrate 200 can be reduced, and the stability of the thickness of the liquid crystal cell is ensured. Thus, it is obvious that the step difference ΔPS between the respective main spacer 300 and the respective sub-spacer 400 in the display panel 20 will further increase by a depth of the groove 250, particularly, in the present embodiment, the depth is d3+d4.

It can be understood that as shown in FIG. 1, the step difference ΔPS between the two spacers is: ΔPS=d1+d2+d3+d4, which increases by d2+d3+d4, when compared with the initial step difference d1 between the respective main spacer 300 and the respective sub-spacer 400. Obviously, the step difference ΔPS between the two spacers greatly increases, such that the stability of the display performance of the display panel is effectively ensured.

It should be understood that the main spacers 300 and the sub-spacers 400 are generally post spacers (PS), and the post spacers may be in the shape of a cylinder, a prism, or a truncated cone, etc., particularly, in one embodiment, both the main spacers 300 and the sub-spacers 400 may have a trapezoidal longitudinal section and a circular, quadrangular, or polygonal cross section. As shown in FIG. 1, the top end of the respective main spacer 300 is generally a plane, and the longitudinal section of the groove 250 is generally rectangular.

It should be further noted that since the integral structure of the display panel in different embodiments may be substantially consistent except that the surface of the top end of the respective main spacer 300 may adopt a curved surface, and/or the shape of the longitudinal section of the groove 250 may be different. Thus, for simplifying the description, the following description is based on the structure of the display panel 20 illustrated in FIG. 1.

In some embodiment, as shown in FIGS. 2-5, a width of the groove 250 may gradually increase in a direction from the opening 251 of the groove 250 to a bottom of the groove 250, that is, in the direction of the depth of the groove 250. It can be understood that the opening of the groove 250 is narrow while the bottom of the groove 250 is wide, that is, the longitudinal section of the groove 250 is in a shape of an inverted trapezoid. This is beneficial for the sub-spacer 400 to be more fluently inserted into the groove 250 when being applied with the supporting force, and the groove functions in guiding the sub-spacer 400.

Figure 3:
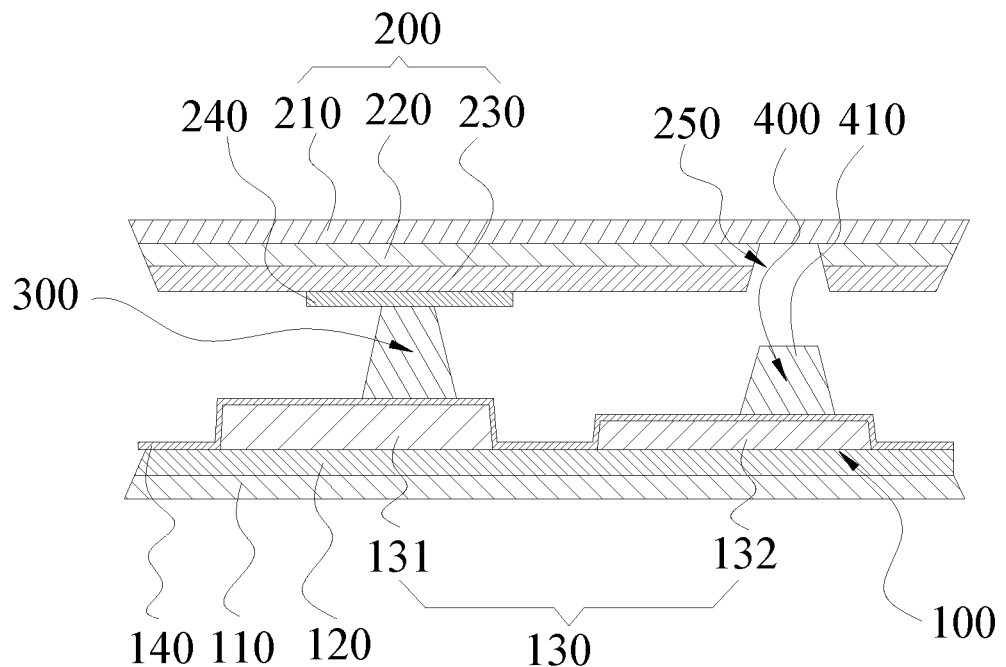
FIG. 3 is a structural schematic view of a cross section of a display panel in a third embodiment of the present application, in which a shape of a longitudinal section of a groove fits with a free end of a sub-spacer, as compared to the embodiment of FIG. 1.
Figure 7:
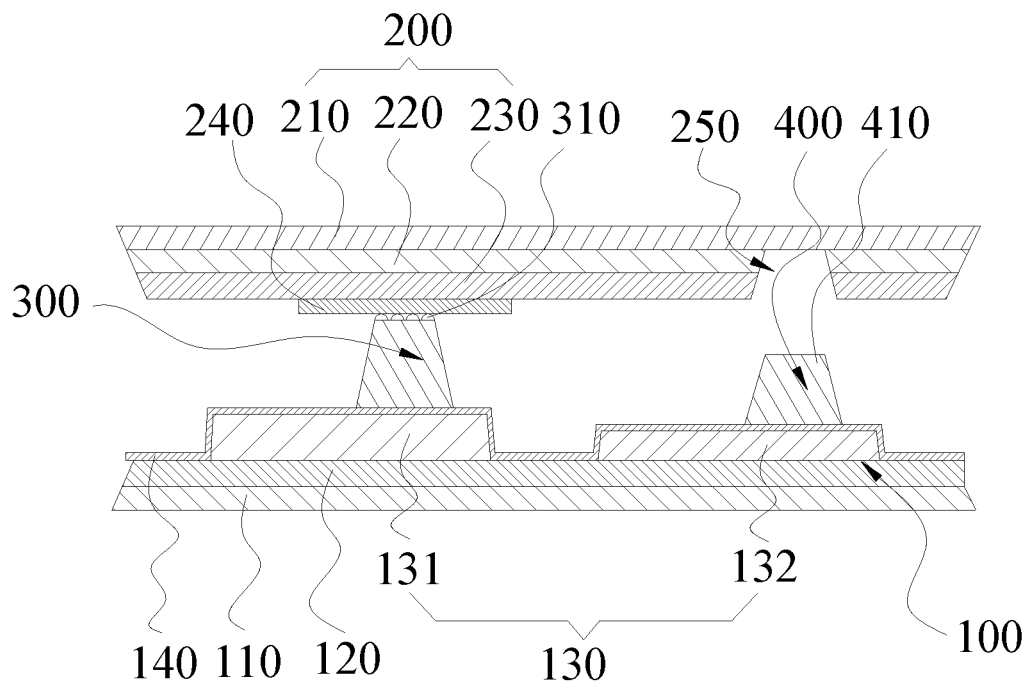
FIG. 7 is a structural schematic view of a cross section of a display panel in a seventh embodiment of the present application, in which a shape of a longitudinal section of a groove fits with a free end of a sub-spacer, as compared to the embodiment of FIG. 6.

In some other embodiments, as shown in FIG. 3 and FIG. 7, the shape of the longitudinal section of the groove 250 is identical with the shape of the longitudinal section of the free end 410 of the respective sub-spacer 400. The groove 250 fits with the free end 400 of the respective sub-spacer 400. Particularly, as shown in FIG. 3, the shape of the longitudinal section of the free end 410 of the respective sub-spacer 400 is a trapezoid, and correspondingly, the shape of the longitudinal section of the groove 250 is also trapezoid. In order to ensure the groove 250 fitting with the free end 400 of the respective sub-spacer 400, the shape of the cross section of the groove 250 is generally identical with the shape of the cross section of the free end 410 of the respective sub-spacer 400, such that after the free end 410 of the respective sub-spacer 400 has been inserted into the groove 250, the sub-spacer 400 would not shake, but rather be substantially embedded inside the groove 250, thus ensuring the stability of the liquid crystal within the liquid crystal bell and further ensuring the stability of the display performance of the display panel.

In one embodiment, generally, an absolute height of the respective sub-spacer 400 is smaller or equal to an absolute height of the respective main spacer 300. It should be noted that, the "absolute height" herein means a height between a bottom of each spacer and a top thereof. Particularly, in one embodiment, the absolute height of the respective sub-spacer 400 is smaller than the absolute height of the respective main spacer 300, but in practice, the technical solution can also be implemented when the absolute height of the respective sub-spacer 400 is equal to the absolute height of the respective main spacer 300. It can be understood that when the absolute heights of the two spacers are identical, the step difference may be generated by the thickness of the transparent conductive layer 240 and the depth of the groove 250, which is obviously more beneficial for controlling the step difference.

In some embodiments, as shown in FIGS. 4-7, a top surface of the respective main spacer 300 in contact with the transparent conductive layer 240 is a curved surface 310. In this way, on the one hand, the main spacers 300 can be more easily restored to its original position and initial shape after sliding; and on the other hand, the contact area between the respective main spacer 300 and the transparent conductive layer 240 can be approximately a point or a line, thereby reducing the contact area. When the main spacers 300 are applied with a horizontal force, a friction between the main spacer 300 and the thin film transistor can be reduced, which further reduces an additional optical delay to realize the purpose of avoiding the light leakage phenomenon in a dark state.

Figure 4:
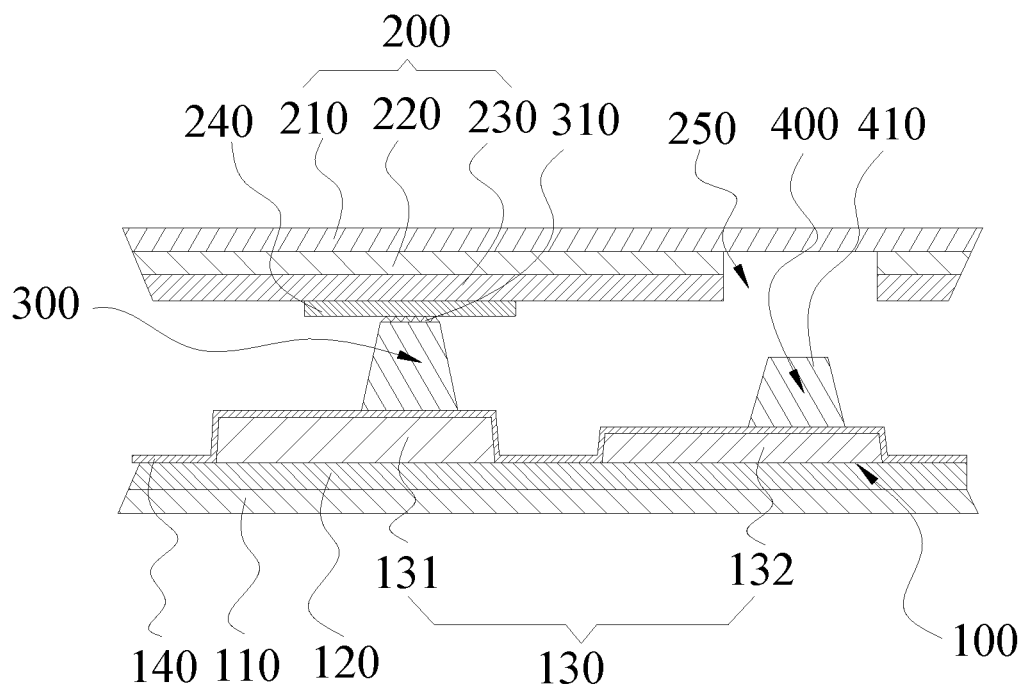
FIG. 4 is a structural schematic view of a cross section of a display panel in a fourth embodiment of the present application, in which a top surface of a spacer in contact with a transparent conductive layer is a curved surface, and particularly a serrated curved surface, as compared to the embodiment of FIG. 1.
Figure 5:
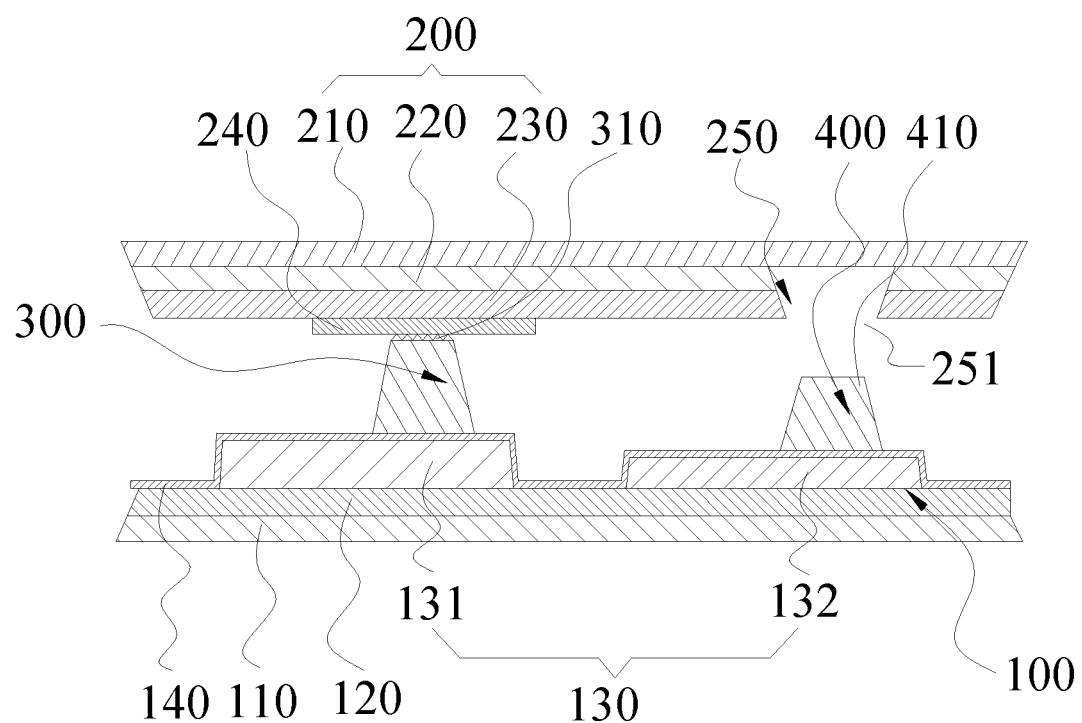
FIG. 5 is a structural schematic view of a cross section of a display panel in a fifth embodiment of the present application, in which a shape of a longitudinal section of a groove is an inverted trapezoid, as compared to the embodiment of FIG. 4.
Figure 6:
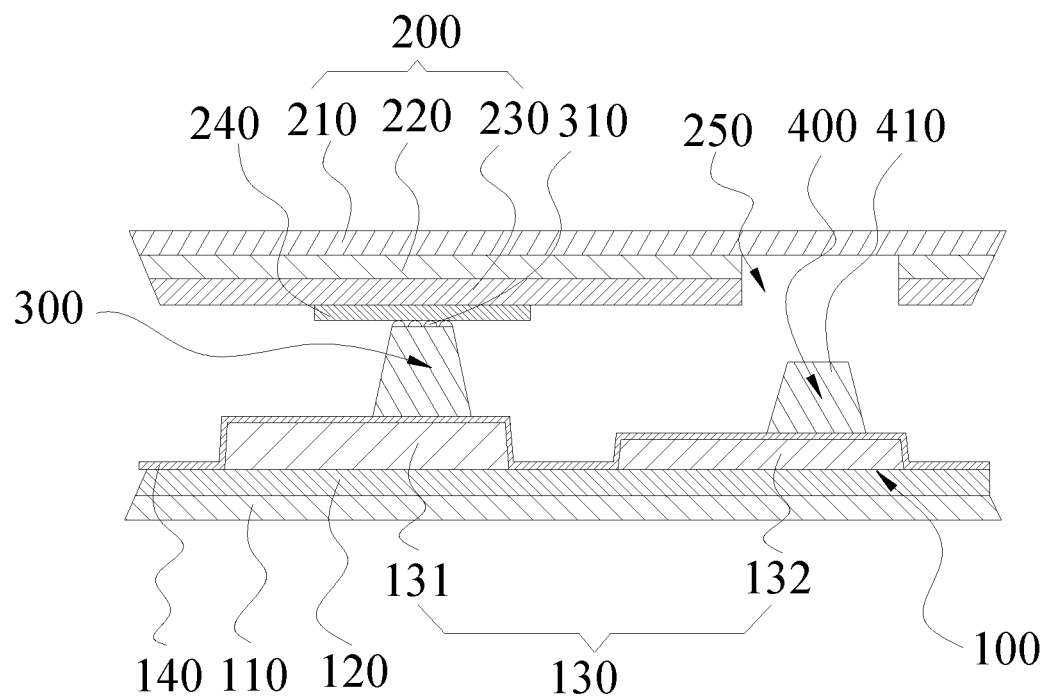
FIG. 6 is a structural schematic view of a cross section of a display panel in a sixth embodiment of the present application, in which a top surface of a spacer in contact with a transparent conductive layer is a curved surface, and particularly a wavy curved surface, as compared to the embodiment of FIG. 1.

Generally, the top surface of the respective main spacer 300 is a semispherical, wavy, or serrated curved surface 310. It can be understood that the curved surface may adopts other suitable shapes. Particularly, as shown in FIG. 4 and FIG. 5, the top surface of the respective main spacer 300 is a serrated curved surface 310, the main spacers 300 in such a structure would not result in lateral slide due to the deformation in case of the press applied to the display panel 20, thus, avoiding the influence on the display performance of the display panel and the damage to the liquid crystal alignment layer of the substrate surface, and further improving the quality of the display panel. Particularly, as shown in FIG. 6 and FIG. 7, the top surface of the respective main spacer 300 is a wavy curved surface 310.

In some embodiments, as shown in FIG. 1 and FIG. 7, the first substrate 100 is a color filter substrate, and the second substrate 200 is an array substrate. It can be understood that, in practice, the first substrate 100 may also be the array substrate or other substrate, and the second substrate 200 may also be the color filter substrate or other substrate.

Particularly, in the present embodiment, taken the first substrate 100 in the form a color filter substrate and the second substrate 200 in the form of an array substrate as an example, as shown in any of FIGS. 1 to 7, the color filter (CF) substrate 100 includes a first substrate layer 110, a black matrix (BM) 120, a color resist layer 130, and an electrode layer 140 which are sequentially arranged. The color resist layer 130 includes a first color resist 131, a second color resist 132, and a third color resist (not shown) of different colors arranged in a matrix. In practice, the color resist layer 130 usually consists of red/green/blue color resists (CR).

As further shown in any of FIGS. 1-7, the respective main spacer 300 and the respective sub-spacer 400 are arranged at the electrode layer 140 and respectively correspond to any two of the first color resist 131, the second color resist 132, and the third color resist. Particularly, in one embodiment, the main spacers 300 are disposed directly above the first color resist 131, and the sub-spacers 400 are disposed directly above the second color resist 132, in which, the first color resist 131 is a blue color resist, and the second color resist 132 is a red color resist. It can be understood that, in practice, the particular colors of the first color resist 131, the second color resist 132, and the third color resist may be determined according to a combination of actual needs.

Correspondingly, as shown in any of FIGS. 1-7, the array substrate 200 includes: a second substrate layer 210, an insulating protective layer 220, and a passivation layer 230. The second substrate layer 210, the insulating protective layer 220, and the passivation layer 230 are sequentially arranged in a direction facing the color filter substrate 100, in one embodiment, particularly from the top to the bottom. It would be appreciated that the passivation layer 230 in the array substrate 200 is closest to the color filter substrate 100.

It should be noted that, in practice, the color filter substrate 100 may also include other components. Similarly, the array substrate 200 may also include other components. Because the figures are all schematic views, in order to highlight the essence of the technical solutions of the present application, some of these components are omitted and not shown in the figures.

To facilitate the formation of the transparent conductive layer 240 on the array substrate 200 and to increase the step difference between the respective main spacer 300 and the respective sub-spacer 400, in one embodiment, as shown in any of FIGS. 1-7, a part of a surface of the passivation layer 230 is provided with the transparent conductive layer 240. In other words, compared to the full coverage among the second substrate layer 210, the insulating protective layer 220, and the passivation layer 230 in the array substrate 200, the transparent conductive layer 240 in the present application does not completely cover a surface of the passivation layer 230, but is applied to a part of the surface of the passivation layer 230. Particularly, it only requires that the range of the application of the transparent conductive layer 240 can satisfy the support and movement range of the main spacers 300.

In addition, the groove 250 may be defined in the passivation layer 230, that is, the groove 250 may only be defined in the passivation layer 230 rather than extending into the insulating protective layer 220. This embodiment of the present application is not shown in the figures, but in practice, the purpose of increasing the step difference between the respective main spacer 300 and the respective sub-spacer 400 can also be achieved. In addition, the increase in the step difference by arranging the groove 250 is smaller than or equal to the thickness d3 of the passivation layer 230.

Or alternatively, as shown in any of FIGS. 1-7, the groove 250 is defined in both the passivation layer 230 and the insulating protective layer 220 with the second substrate layer 210 exposed. In this case, the increase in the step difference by arranging the groove 250 is equal to a sum of the thickness d3 of the passivation layer 230 and the thickness d4 of the insulating protective layer 220.

It can be appreciated that in practical application, the increase in the step difference between the two pacers by arranging the groove 250 ranges from 0 to d3+d4, in which, a particular depth of the groove 250 may be determined according to practical needs.

It can be understood that, in one embodiment, the key material of the color filter substrate 100 is substantially maintained, and the light cover of the ITO process and the passivation layer process in the array substrate 200 is specially designed, in particular, the transparent conductive layer 240 is plated on the array substrate 200 which is pressed against by the main spacer 300, and the groove 250 is defined in the passivation layer 230 and the insulating protective layer 220 of the array substrate 200 which is arranged opposite the respective sub-spacer 400, thereby increasing the step difference between the respective main spacer 300 and the respective sub-spacer 400. Particularly, in this embodiment, the step difference between the respective main spacer 300 and the respective sub-spacer 400 is ΔPS=d1+d2+d3+d4, that is, the thickness of the transparent conductive layer 240, the thickness of the passivation layer 230, and the thickness of the insulating protective layer 220 are increased, so that not only is the purpose of increasing the difference between the two spacers achieved, but also the light cover is not required and no additional cost is required, that is, on the basis of not increasing the structure and cost, the purpose of increasing the step difference is realized, thus improving the product quality of the display panel and increasing the market competitiveness of the display panel.

It should be noted that, in one embodiment, both the first substrate layer 110 and the second substrate layer 210 are glass substrates, and it should be understood that in practical the first substrate layer 110 and the second substrate layer 210 may be substrates made of other materials. The passivation layer 230 may be generally a SiNx layer. The groove 250 may usually be achieved by a dry engraving process.

Figure 8:
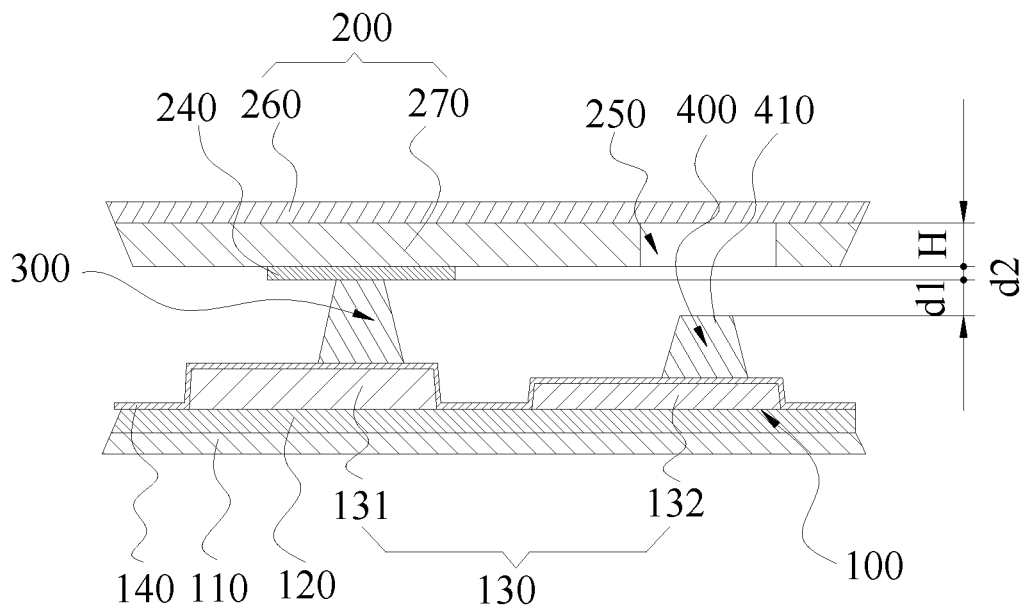
FIG. 8 is a structural schematic view of a cross section of a display panel in an eighth embodiment of the present application, in which an array substrate includes an array substrate layer and a dielectric layer, and a part of a surface of the dielectric layer is provided with a transparent conductive layer, and a groove is defined on the dielectric layer, and a longitudinal section of the groove is rectangular.
Figure 9:
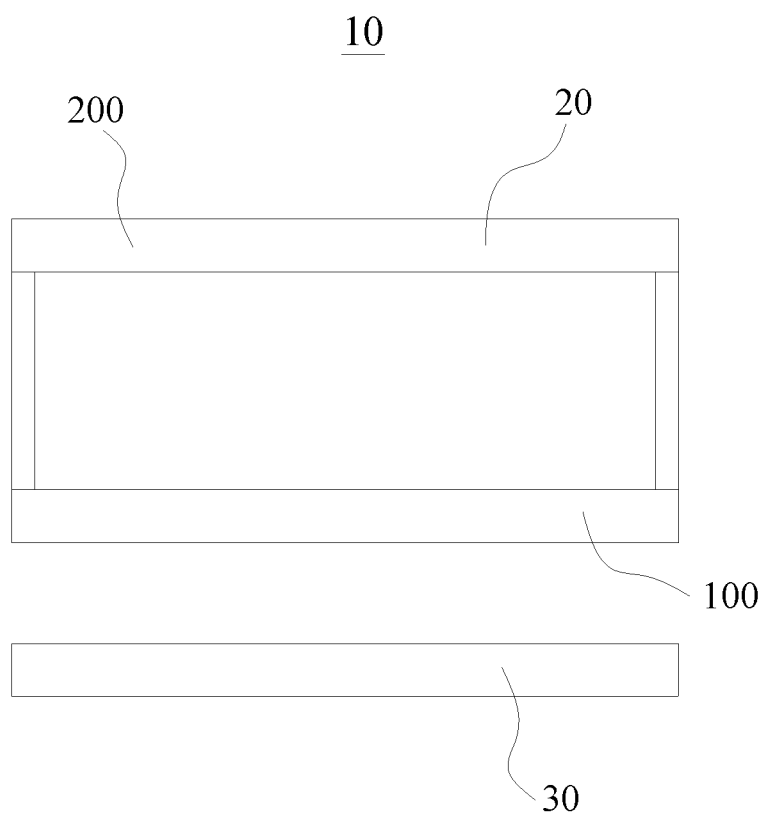
FIG. 9 is a structural schematic view of a cross section of a display panel in some embodiments of the present application.

The present application further provides a display panel 20, as shown in FIG. 8, the display panel 20 comprises a color filter substrate 100, an array substrate 200, main spacers 300, and sub-spacers 400. The array substrate 200 and the color filter substrate 100 are arranged opposite each other and spaced apart from each other. As further shown in FIG. 8, the main spacers 300 are arranged between the color filter substrate 100 and the array substrate 200, a bottom end of the respective main spacer 300 is arranged at the color filter substrate 100, and a top end thereof presses against the array substrate 200. Correspondingly, the sub-spacers 400 are arranged between the color filter substrate 100 and the array substrate 200, of which, a bottom end of the respective sub-spacer 400 is arranged at the color filter substrate 100, and a top end thereof is a free end 410. It can be understood that, in this embodiment, the main spacers 300 and the sub-spacers 400 are located on the same side and are both fixed at the color filter substrate 100.

In one embodiment, the array substrate 200 includes an array substrate layer 260 and a dielectric layer 270, in which, the array substrate layer 260 and the color filter substrate 100 are arranged opposite and spaced apart from each other. The dielectric layer 270 is arranged at one side of the array substrate layer adjacent to the color filter substrate 100. In order to increase the step difference between the respective main spacer 300 and the respective sub-spacer 400, a part of a surface of one side of the dielectric layer 270 adjacent to the color filter substrate 100 is provided with a transparent conductive layer 240, and the dielectric layer 270 defines therein a groove 250. The transparent conductive layer 240 is in abutting connection with a top end of the respective main spacer 300, such that the abut connection between the respective main spacer 300 and the array substrate 200 are realized. In addition, by means of this arrangement, the step difference ΔPS between the respective main spacer 300 and the respective sub-spacer 400 increases by a thickness d2 of the transparent conductive layer 240.

Correspondingly, an opening 251 of the groove 250 is arranged opposite the respective sub-spacer 400. And when the respective sub-spacer 400 is applied with a supporting force, the free end 410 of the respective sub-spacer 400 can be inserted into the groove 250, which is beneficial to reduce a lowering height of the array substrate 200 and ensure the stability of the liquid crystal cell. In one embodiment, a depth of the groove 250 is smaller than or equal to a height of the dielectric layer. In other words, the groove 250 may not be across the whole dielectric layer 270. It can be understood that given a height of the dielectric layer 270 is H, then the depth of the groove 250 ranges from 0 to H.

It should be noted that, in one embodiment, the array substrate layer 260 is generally a glass substrate made of a glass material, and it should be understood that they may also be substrates made of other suitable materials. In addition, in this embodiment, the dielectric layer 270 includes an insulating protective layer 220 and an passivation layer 230 described above. It can be understood that, in fact, the dielectric layer 270 may also include other film layers. Alternatively, in the present embodiment, the dielectric layer 270 is another film layer.

It can be understood that in the display panel 20 provided by this embodiment, the step difference ΔPS between the respective main spacer 300 and the respective sub-spacer 400 can also increase by a thickness of the transparent conductive layer 240 and a depth of the groove 250, and particularly, based on the initial step difference, ΔPS=d1+d2+(0 to d3+d4).

The present application further provides a display device 10, and the display device 10 includes the display panel 20 as described in the above. Generally, when the display device 10 is a liquid crystal display device, the display device 10 further includes a backlight module 30 configured to provide backlighting for the display panel 20. Particularly, in one embodiment, the display device 10 can be products or parts with any display functions, such as such as liquid crystal televisions, liquid crystal displays, notebook computers, digital photo frames, mobile phones, navigators, tablet computers, etc.

The above description is only optional embodiments of the present application, and is not intended to limit the present application. Any modifications, equivalent substitutions, and improvements made within the spirit and principles of the present application are included in the protection scope of the present application.

What is claimed is:

1. A display panel, comprising:
   a first substrate;
   a second substrate, arranged opposite to and spaced apart from the first substrate;
   main spacers, arranged between the first substrate and the second substrate, with each main spacer having a bottom end arranged at the first substrate and a top end abutting against the second substrate; and
   sub-spacers, arranged between the first substrate and the second substrate, with each sub-spacer having a bottom end arranged at the first substrate and a top end being a free end;
   wherein
      a part of a surface of one side of the second substrate adjacent to the first substrate is provided with a transparent conductive layer, and the second substrate defines therein a groove;
      the transparent conductive layer is in abutting connection with the top end of the respective main spacer; and
      an opening of the groove is arranged opposite the respective sub-spacer, and configured to allow the free end of the respective sub-spacer to be inserted therein.

2. The display panel according to claim 1, wherein a width of the groove gradually increase in a direction from the opening of the groove to a bottom of the groove.

3. The display panel according to claim 1, wherein a shape of a longitudinal section of the groove is identical with a shape of a longitudinal section of the free end of the sub-spacer, and the groove fits with the free end of the sub-spacer.

4. The display panel according to claim 1, wherein an absolute height of the respective sub-spacer is smaller or equal to an absolute height of the respective main spacer.

5. The display panel according to claim 4, wherein a top surface of the respective main spacer in contact with the transparent conductive layer is a curved surface.

6. The display panel according to claim 5, wherein the top surface of the respective main spacer is a semispherical, wavy, or serrated curved surface.

7. The display panel according to claim 4, wherein the first substrate is a color filter substrate, and the second substrate is an array substrate.

8. The display panel according to claim 7, wherein
   the color filter substrate comprises a first substrate layer, a black matrix, a color resist layer, and an electrode layer arranged in sequence;
   the color resist layer comprises a first color resist, a second color resist, and a third color resist of different colors arranged in a matrix;
   the respective main spacer and the respective sub-spacer are arranged at the electrode layer and respectively correspond to any two of the first color resist, the second color resist, and the third color resist;
   the array substrate comprises: a second substrate layer, an insulating protective layer, and a passivation layer sequentially arranged in a direction facing the color filter substrate;
   a part of a surface of the passivation layer is provided with the transparent conductive layer; and
   the groove is defined in the passivation layer, or
   the groove is defined in both the passivation layer and the insulating protective layer with the second substrate layer exposed.

9. The display panel according to claim 1, wherein a width of the groove gradually increase in a direction from the opening of the groove to a bottom of the groove; and an absolute height of the respective sub-spacer is smaller or equal to an absolute height of the respective main spacer.

10. The display panel according to claim 9, wherein a top surface of the respective main spacer in contact with the transparent conductive layer is a curved surface.

11. The display panel according to claim 10, wherein the top surface of the respective main spacer is a semispherical, wavy, or serrated curved surface.

12. The display panel according to claim 9, wherein the first substrate is a color filter substrate, and the second substrate is an array substrate.

13. The display panel according to claim 12, wherein
   the color filter substrate comprises a first substrate layer, a black matrix, a color resist layer, and an electrode layer arranged in sequence;
   the color resist layer comprises a first color resist, a second color resist, and a third color resist of different colors arranged in a matrix;
   the respective main spacer and the respective sub-spacer are arranged at the electrode layer and respectively correspond to any two of the first color resist, the second color resist, and the third color resist;
   the array substrate comprises: a second substrate layer, an insulating protective layer, and a passivation layer sequentially arranged in a direction facing the color filter substrate;
   a part of a surface of the passivation layer is provided with the transparent conductive layer; and
   the groove is defined in the passivation layer, or
   the groove is defined in both the passivation layer and the insulating protective layer with the second substrate layer exposed.

14. The display panel according to claim 1, wherein a shape of a longitudinal section of the groove is identical with a shape of a longitudinal section of the free end of the sub-spacer, and the groove fits with the free end of the sub-spacer; and an absolute height of the respective sub-spacer is smaller or equal to an absolute height of the respective main spacer.

15. The display panel according to claim 14, wherein a top surface of the respective main spacer in contact with the transparent conductive layer is a curved surface.

16. The display panel according to claim 15, wherein the top surface of the respective main spacer is a semispherical, wavy, or serrated curved surface.

17. The display panel according to claim 14, wherein the first substrate is a color filter substrate, and the second substrate is an array substrate.

18. The display panel according to claim 17, wherein
   the color filter substrate comprises a first substrate layer, a black matrix, a color resist layer, and an electrode layer arranged in sequence;
   the color resist layer comprises a first color resist, a second color resist, and a third color resist of different colors arranged in a matrix;
   the respective main spacer and the respective sub-spacer are arranged at the electrode layer and respectively correspond to any two of the first color resist, the second color resist, and the third color resist;
   the array substrate comprises: a second substrate layer, an insulating protective layer, and a passivation layer sequentially arranged in a direction facing the color filter substrate;
   a part of a surface of the passivation layer is provided with the transparent conductive layer; and
   the groove is defined in the passivation layer, or the groove is defined in both the passivation layer and the insulating protective layer with the second substrate layer exposed.

19. A display panel, comprising:

a color filter substrate;

an array substrate, arranged opposite to and spaced apart from the color filter substrate;

main spacers, arranged between the color filter substrate and the array substrate, with each main spacer having a bottom end arranged at the color filter substrate and a top end abutting against the array substrate; and sub-spacers, arranged between the color filter substrate and the array substrate, with each sub-spacer having a bottom end arranged at the color filter substrate and a top end being a free end;

the array substrate comprising:

an array substrate layer, arranged opposite to and spaced apart from the color filter substrate; and a dielectric layer, arranged at one side of the array substrate layer adjacent to the color filter substrate;

wherein a part of a surface of one side of the dielectric layer adjacent to the color filter substrate is provided with a transparent conductive layer, and the dielectric layer defines therein a groove;

the transparent conductive layer is in abutting connection with a top end of the respective main spacer to increase a step difference between the respective main spacer and the respective sub-spacer;

an opening of the groove is arranged opposite the respective sub-spacer, and configured to allow the free end of the respective sub-spacer to be inserted therein; and a depth of the groove is smaller or equal to a height of the dielectric layer.

20. A display device, comprising a display panel, and wherein the display panel comprises:

a first substrate;

a second substrate, arranged opposite to and spaced apart from the first substrate;

main spacers, arranged between the first substrate and the second substrate, with each main spacer having a bottom end arranged at the first substrate and a top end abutting against the second substrate; and sub-spacers, arranged between the first substrate and the second substrate, with each sub-spacer having a bottom end arranged at the first substrate and a top end being a free end;

wherein a part of a surface of one side of the second substrate adjacent to the first substrate is provided with a transparent conductive layer, and the second substrate defines therein a groove;

the transparent conductive layer is in abutting connection with the top end of the respective main spacer; and an opening of the groove is arranged opposite the respective sub-spacer, and configured to allow the free end of the respective sub-spacer to be inserted therein.

* * * * *